(12) United States Patent
Sharma et al.

(10) Patent No.: US 10,872,323 B2
(45) Date of Patent: Dec. 22, 2020

(54) SYSTEM AND METHOD FOR STAND-IN PROCESSING

(71) Applicant: MASTERCARD INTERNATIONAL INCORPORATED, Purchase, NY (US)

(72) Inventors: Piyush Sharma, Pune (IN); Ravinder Wadhwa, Pune (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 332 days.

(21) Appl. No.: 15/811,894

(22) Filed: Nov. 14, 2017

(65) Prior Publication Data

US 2018/0144318 A1    May 24, 2018

(30) Foreign Application Priority Data

Nov. 21, 2016 (SG) ............................ 10201609753R

(51) Int. Cl.
*G06Q 20/20* (2012.01)
*G06Q 20/40* (2012.01)

(52) U.S. Cl.
CPC ......... *G06Q 20/20* (2013.01); *G06Q 20/4012* (2013.01); *G06Q 20/4018* (2013.01)

(58) Field of Classification Search
CPC . G06Q 20/20; G06Q 20/4012; G06Q 20/4018
See application file for complete search history.

(56) References Cited

U.S. PATENT DOCUMENTS

| | | | |
|---|---|---|---|
| 7,828,204 B2 | 11/2010 | Fiebiger et al. | |
| 8,136,726 B2 | 3/2012 | Ferrara et al. | |
| 8,556,170 B2 | 10/2013 | Fiebiger et al. | |
| 8,584,936 B2 | 11/2013 | Fiebiger et al. | |
| 9,454,865 B2 | 9/2016 | Kranzley et al. | |
| 2004/0128195 A1* | 7/2004 | Sorem ................ | G06Q 30/0255 705/14.53 |
| 2014/0304158 A1 | 10/2014 | Basu et al. | |
| 2015/0088756 A1 | 3/2015 | Makhotin et al. | |
| 2016/0125417 A1 | 5/2016 | Huang et al. | |
| 2016/0364720 A1 | 12/2016 | Kranzley et al. | |
| 2017/0076288 A1* | 3/2017 | Awasthi .................. | H04L 63/10 |

OTHER PUBLICATIONS https://www.cryptomathic.com/hubfs/docs/cryptomathic_white_paper-emv_key_management.pdf, Oct. 2015 (Year: 2015).*
https://www.cba-ok.org/wp-content/uploads/2016/09/VBN-Mitigating-Fraud-Risk-Through-Card-Data-Verification-002.pdf ("Visa") dated Oct. 8, 2015 (Year: 2015).*

* cited by examiner

*Primary Examiner* — Florian M Zeender
*Assistant Examiner* — Joseph M Mutschler
(74) *Attorney, Agent, or Firm* — Armstrong Teasdale LLP

(57) ABSTRACT

A system and method for stand-in processing are provided. The system includes a processor and a memory unit communicatively coupled to the processor. The memory unit is configured to store transaction data received from an acquirer corresponding to a transaction made by a payment card. The processor is configured to determine data representing a point of sale (POS) entry mode of the transaction from the transaction data and, using one or more stand-in rules provided by an issuer of the payment card, process the transaction on behalf of the issuer based on the data representing the POS entry mode. Processing includes approving or declining the transaction.

12 Claims, 4 Drawing Sheets

SYSTEM AND METHOD FOR STAND-IN PROCESSING

CROSS REFERENCE TO RELATED APPLICATIONS

This patent application claims priority to Singapore Application No. 10201609753R filed on Nov. 21, 2016, the disclosure of which is incorporated by reference herein in its entirety as part of the present application.

BACKGROUND

The present disclosure relates broadly, but not exclusively, to a system and method for stand-in processing of a transaction involving a payment card.

In payment card transaction processing, stand-in processing or authorization is a service provided by a payment card network, in which the payment card network acts on behalf of the issuer or as a back-up to the issuer in the authorization process. This can happen, for example, when the issuer's systems are not available or when the issuer delegates the authorization of certain transactions to the payment card network.

Typically, the issuer establishes stand-in parameters that control which transactions are subject to stand-in authorization. Stand-in parameters are conventionally based on the Bank Identification Number (BIN) range (also known as the Issuer Identification Number—IIN—range) and therefore have certain limitations. For example, while it is possible to edit or remove the stand-in authorization set up for a BIN, other types of customization cannot be done.

A need therefore exists to provide a method and system that seeks to address the above problems or provide a useful alternative.

BRIEF DESCRIPTION

An aspect of the present disclosure provides a system for stand-in processing, including a processor and a memory unit communicatively coupled to the processor. The memory unit is configured to store transaction data received from an acquirer corresponding to a transaction made by a payment card. The processor is configured to determine data representing a point of sale (POS) entry mode of the transaction from the transaction data and, using one or more stand-in rules provided by an issuer of the payment card, process the transaction on behalf of the issuer based on the data representing the POS entry mode, wherein processing includes approving or declining the transaction.

The processor may be configured to select the transaction for processing based on the POS entry mode prior to processing the transaction.

The processor may be configured to process the transaction on behalf of the issuer through a zone control master key (ZCMK) shared by the issuer.

The zone control master key may include a PIN verification key (PVK).

The zone control master key may include a card verification key (CVK).

The data representing the POS entry mode may include the data element 22 of a message compliant with ISO 8583.

The transaction may include one of a group consisting of a web-based transaction, an ATM-based transaction, and a POS device-based transaction.

A second aspect of the present disclosure provides a method for stand-in processing. The method includes receiving, from an acquirer, transaction data corresponding to a transaction made by a payment card. Using a processor, data representing a point of sale (POS) entry mode of the transaction is determined from the transaction data. Using one or more stand-in rules provided by an issuer of the payment card, the transaction is processed on behalf of the issuer based on the data representing the POS entry mode, wherein processing includes approving or declining the transaction.

The method may further include selecting the transaction for processing based on the POS entry mode prior to the processing step.

Processing the transaction on behalf of the issuer may include using a zone control master key (ZCMK) shared by the issuer.

The zone control master key may include a PIN verification key (PVK).

The zone control master key may include a card verification key (CVK).

The data representing the POS entry mode may include the data element 22 of a message compliant with ISO 8583.

The transaction may include one of a group consisting of a web-based transaction, an ATM-based transaction, and a POS device-based transaction.

BRIEF DESCRIPTION OF THE DRAWINGS

Embodiments of the disclosure will be better understood and readily apparent to one of ordinary skill in the art from the following written description, when read in conjunction with the drawings, in which.

DETAILED DESCRIPTION

Figure 1:
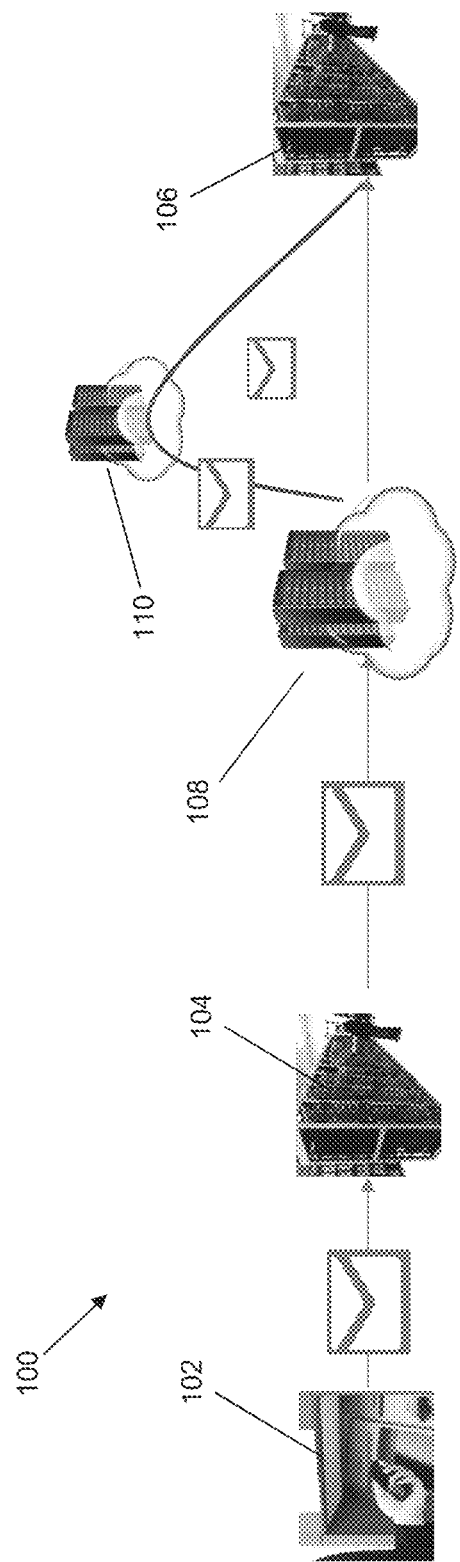
FIG. 1 shows a schematic diagram illustrating the stand-in authorization process according to an example embodiment of the present disclosure.

Embodiments of the present disclosure provide a method and system to manage stand-in authorization or processing of a transaction involving a payment card based on the point of sale (POS) entry mode, instead of solely based on the Bank Identification Number (BIN).

The example embodiments will now be described, by way of example only, with reference to the drawings. Like reference numerals and characters in the drawings refer to like elements or equivalents.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission, or display devices.

The present disclosure also provides an apparatus for performing the operations of the methods. Such apparatus may be specially constructed for the required purposes, or may include a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present disclosure also implicitly provides a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the disclosure.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM, GPRS, 3G or 4G mobile telephone systems, as well as other wireless systems such as Bluetooth, ZigBee, Wi-Fi. The computer program when loaded and executed on such a general-purpose computer effectively results in an apparatus that implements the steps of the preferred method.

The present disclosure may also be implemented as hardware modules. More particularly, in the hardware sense, a module is a functional hardware unit designed for use with other components or modules. For example, a module may be implemented using discrete electronic components, or it can form a portion of an entire electronic circuit such as an Application Specific Integrated Circuit (ASIC) or Field Programmable Gate Array (FPGA). Numerous other possibilities exist. Those skilled in the art will appreciate that the system can also be implemented as a combination of hardware and software modules.

The present disclosure relates to methods for stand-in authorization of a transaction involving a payment card.

Currently, many merchants accept electronic payment transactions as an alternative to cash for the payment for products. In such electronic payment transactions, a payment card may be used. As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers.

FIG. 1 shows a schematic diagram 100 illustrating the stand-in authorization process according to an example embodiment. Typically, in a payment card transaction, when a payment card holder (consumer) wishes to purchase a product/service from a merchant at a point of sale (POS) 102, the payment card holder presents his/her payment card to the merchant. The merchant then submits a request to an acquirer 104 (a financial institution such as a bank that processes and settles the merchant's transactions with the help of an issuer). The acquirer 104 then sends the request to the issuer 106 (a financial institution, bank, credit union or company that issues or helps issue cards to payment card holders) to authorize the transaction. A payment facilitator, also known as a card network or card scheme 108 (e.g. MasterCard®), acts as an intermediary between the acquirer 104 and the issuer 106. As described in more detail below, the card network 108 in the example embodiments further includes stand-in authorization services, in the form of an application or module 110 that authorizes the transaction on behalf of the issuer 106. If the card network 108 authorizes the transaction using application/module 110 or if issuer 106 authorizes the transaction, the merchant releases the product/service to the payment card holder.

The transaction authorization process described above involves multiple parties (payment card holder (consumer), merchant 102, acquirer 104, issuer 106, Stand-In Authorization Service 110, and payment facilitator 108). However, the transaction authorization process may be essentially viewed as a transaction between a payment card holder and a merchant (with the other parties facilitating the transaction).

During the transaction, certain data associated with the transaction (i.e. transaction data) may be generated and the transaction data may be captured/collected by the payment facilitator 108. Such transaction data may be stored in a transaction database. For example, the transaction data may be uploaded to a data warehouse on a regular basis (e.g. daily, weekly, monthly). If necessary, various algorithms/rules can be applied to anonymize the transaction data so that no personally identifiable numbers are available to the users of the transaction data.

The transaction data that can be generated/captured include transaction level information (e.g. Transaction ID, Account ID (anonymized), Merchant ID, Transaction Amount, Transaction Local Currency Amount, Date of Transaction, Time of Transaction, Type of Transaction, Date of Processing, Cardholder Present Code Merchant Category Code (MCC)), Account Information (e.g. Account ID (anonymized), Card Group Code, Card Product Code, Card Product Description, Card Issuer Country, Card Issuer ID, Card Issuer Name, Aggregate Card Issuer ID, Aggregate Card Issuer Name), Merchant Information (e.g. Merchant ID, Merchant Name, MCC/Industry Code, Industry Description, Merchant Country, Merchant Address, Merchant Postal Code, Aggregate Merchant ID, Aggregate Merchant Name, Merchant Acquirer Country, Merchant Acquirer ID), and Issuer Information (e.g. Issuer ID, Issuer Name, Aggregate Issuer ID, Issuer Country).

Typically, the transaction data may be organized according to a standard, for example, standards promulgated by the International Organization for Standardization (ISO). For example, ISO 8583 defines a message format for financial transaction card originated messages, in which standard fields carrying transaction information are known as data elements. Up to 128 data elements may be defined.

Figure 2:
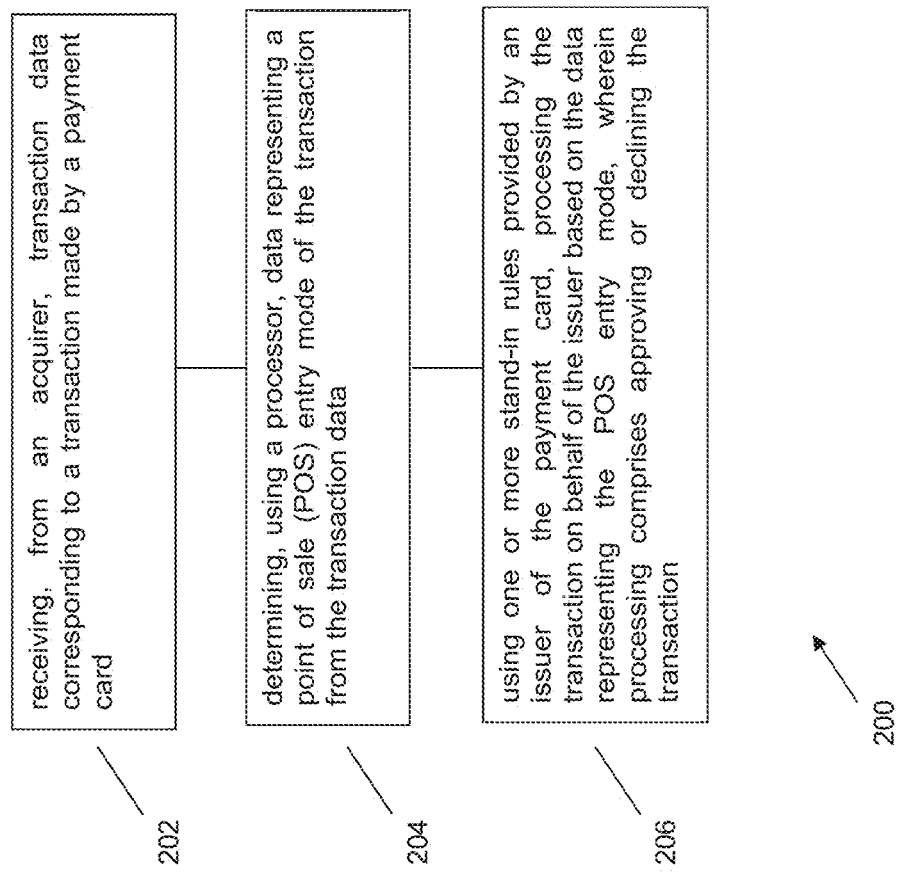
FIG. 2 shows a flow chart illustrating a method for stand-in processing of a transaction involving a payment card according to an example embodiment of the present disclosure.

FIG. 2 shows a flow chart 200 illustrating a method for stand-in processing according to an example embodiment. At step 202, transaction data corresponding to a transaction made by a payment card is received from an acquirer. At step 204, data representing a point of sale (POS) entry mode of the transaction is determined from the transaction data using a processor. At step 206, using one or more stand-in rules provided by an issuer of the payment card, the transaction is processed on behalf of the issuer based on the data representing the POS entry mode. Processing may include approving or declining the transaction.

The present method seeks to provide stand-in processing of the transaction based on the POS entry mode, instead of solely based on the BIN data. Thus, in one implementation of step 204, the method looks for the data element 22 of the standardized message compliant with ISO 8583 that is received from the acquirer to identify where the transaction was initiated prior to step 206. In other words, the mode or type of transaction is determined, since each type of transaction has a unique POS entry mode value in the data element 22. For example, the transaction may be a web-based transaction, an ATM-based transaction, or a POS device-based transaction.

With reference to FIG. 1, typically the issuer 106 configures the stand-in setup according to it requirements. This can be done via a Web interface for example. The requirements may be specific to a transaction type or according to any stand-in parameters defined by the issuer 106. For example, the issuer 106 may allow the application 110 of the card network 108 to perform stand-in processing of ATM-based transactions only. The issuer 106 is not excluded from setting stand-in parameters at the BIN level, rather, the present method provides additional mechanisms to select a transaction for stand-in processing.

The issuer 106 also provides one or more rules to the application 110 for stand-in processing of the transaction. For example, a rule may specify a maximum transaction amount that can be subjected to stand-in processing. Another rule may specify the maximum number of transactions permitted over a specified period, e.g. one day, one week, or one month. Other rules may be prescribed by the issuer 106 as appropriate such that, together with the stand-in parameters, the issuer 106 has overall system management rights.

Furthermore, the issuer 106 shares the relevant keys, such as the zone control master key (ZCMK) with the application or module 110 for secure processing. For example, the ZCMK can be the PIN Verification Key (PVK) and/or the Card Verification Key 1 (CVK 1). The sharing of the zonal key can facilitate the PVK and CVK values to be transferred from the issuer 106 to stand-in application or module 110.

Figure 3:
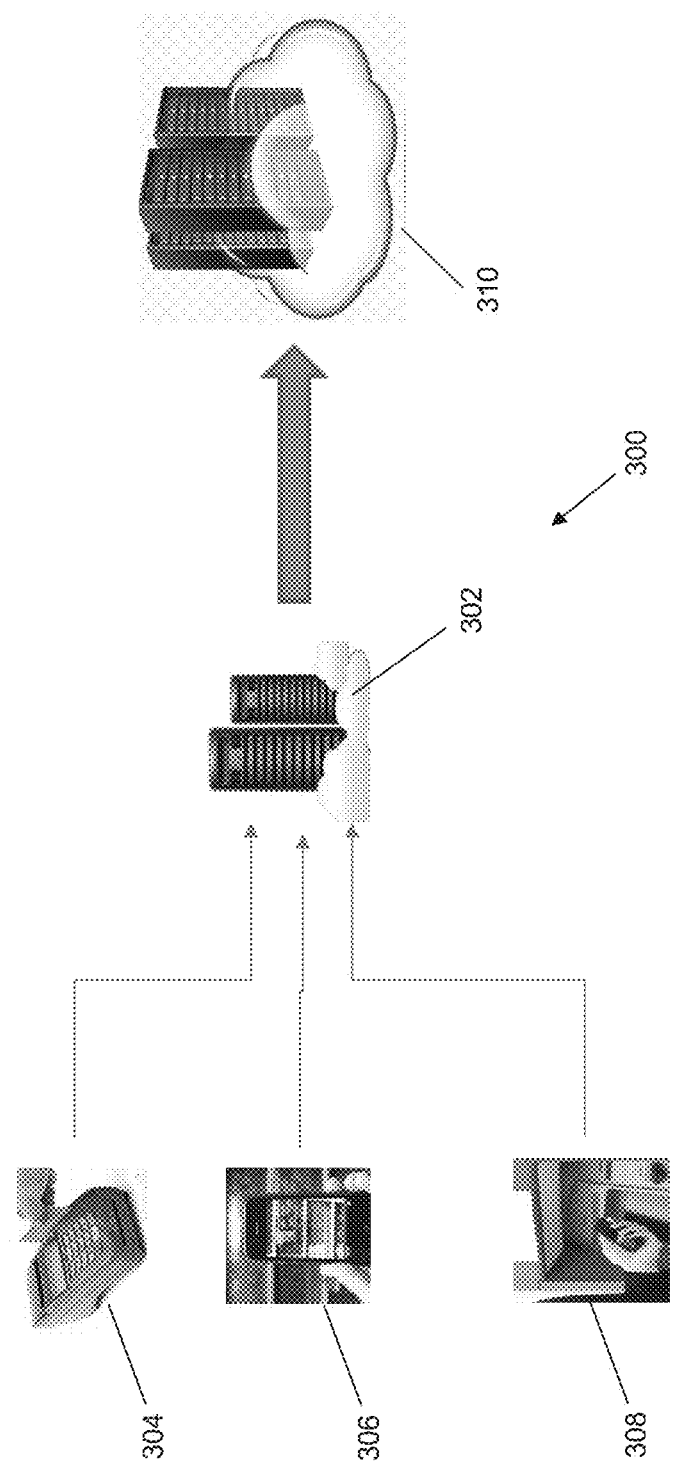
FIG. 3 shows a schematic diagram illustrating an example configuration of the method of FIGS. 1 and 2.

FIG. 3 shows a schematic diagram 300 illustrating an example configuration of the method and system of the example embodiments. During operation, a server 302 of the card network 108 (FIG. 1) receives a message compliant with ISO 8583 containing transaction data of the transaction, which may be a POS device-based transaction 304, a web-based transaction 306, or an ATM-based transaction 308.

The server 302 determines, based on the POS entry mode value of the data element 22 and the stand-in parameters set up by the issuer 106 (FIG. 1), whether the transaction should be selected for stand-in processing. If the transaction does not qualify for stand-in processing, the message is routed to the issuer 106. On the other hand, if the transaction qualifies for stand-in processing, the message is handled by a stand-in service 310 of the card network 108. The stand-in service 310 applies the rule(s) provided by the issuer 106 and either approves or declines the transaction. Typically, the card network then communicates the outcome of the processing to the acquirer 104 (FIG. 1).

The method and system of the example embodiments can thus provide more options to customize stand-in processing of a transaction, particularly based on the POS entry mode. The issuer can maintain overall control by determining the stand-in requirements such that stand-in processing can kick in to avoid the possibility of a transaction being declined in the event that the issuer's server is down or disrupted. The method and system of the example embodiments can also minimize the load of processing Low Value Transactions, can set up rules for the Stand-In services to take action on such transactions.

Figure 4:
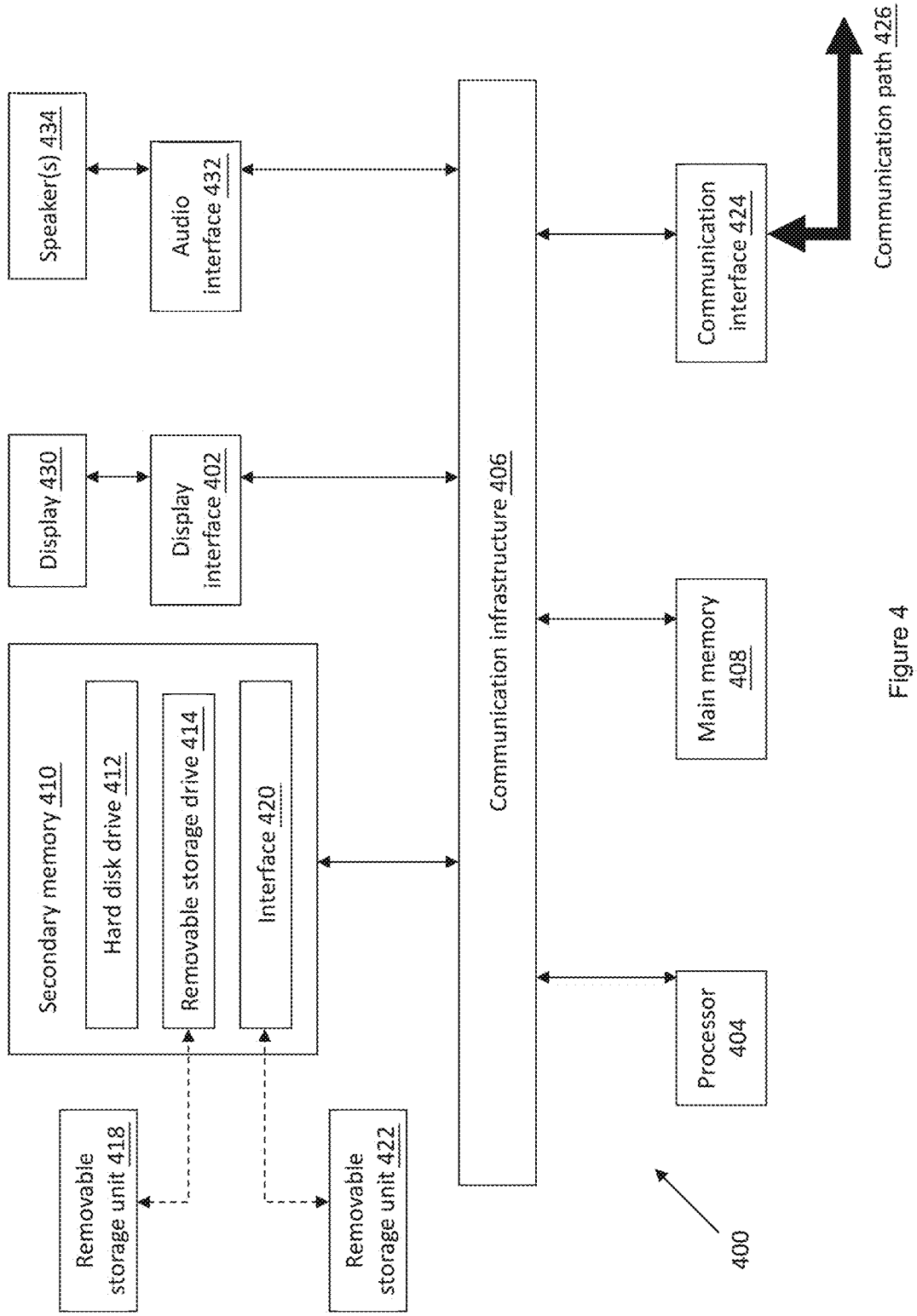
FIG. 4 shows a schematic diagram illustrating an example computer system capable of implementing the method of FIGS. 1 and 2.

FIG. 4 depicts an exemplary computing device 400, hereinafter interchangeably referred to as a computer system 400, where one or more such computing devices 400 may be used for the server 302, the acquirer's system or the issuer's system. The following description of the computing device 400 is provided by way of example only and is not intended to be limiting.

As shown in FIG. 4, the example computing device 400 includes a processor 404 for executing software routines. Although a single processor is shown for the sake of clarity, the computing device 400 may also include a multi-processor system. The processor 404 is connected to a communication infrastructure 406 for communication with other components of the computing device 400. The communication infrastructure 406 may include, for example, a communications bus, cross-bar, or network.

The computing device 400 further includes a main memory 408, such as a random access memory (RAM), and a secondary memory 410. The secondary memory 410 may include, for example, a hard disk drive 412 and/or a removable storage drive 414, which may include a floppy disk drive, a magnetic tape drive, an optical disk drive, or the like. The removable storage drive 414 reads from and/or writes to a removable storage unit 418 in a well-known manner. The removable storage unit 418 may include a floppy disk, magnetic tape, optical disk, or the like, which is read by and written to by removable storage drive 414. As will be appreciated by persons skilled in the relevant art(s), the removable storage unit 418 includes a computer readable storage medium having stored therein computer executable program code instructions and/or data.

In an alternative implementation, the secondary memory 410 may additionally or alternatively include other similar means for allowing computer programs or other instructions to be loaded into the computing device 400. Such means can include, for example, a removable storage unit 422 and an interface 420. Examples of a removable storage unit 422 and interface 420 include a program cartridge and cartridge interface (such as that found in video game console devices), a removable memory chip (such as an EPROM or PROM) and associated socket, and other removable storage units 422 and interfaces 420 which allow software and data to be transferred from the removable storage unit 422 to the computer system 400.

The computing device 400 also includes at least one communication interface 424. The communication interface 424 allows software and data to be transferred between computing device 400 and external devices via a communication path 426. In various embodiments of the disclosure, the communication interface 424 permits data to be transferred between the computing device 400 and a data communication network, such as a public data or private data communication network. The communication interface 424 may be used to exchange data between different computing devices 400 which such computing devices 400 form part an interconnected computer network. Examples of a communication interface 424 can include a modem, a network interface (such as an Ethernet card), a communication port, an antenna with associated circuitry and the like. The communication interface 424 may be wired or may be wireless. Software and data transferred via the communication interface 424 are in the form of signals which can be electronic, electromagnetic, optical or other signals capable of being received by communication interface 424. These signals are provided to the communication interface via the communication path 426.

As shown in FIG. 4, the computing device 400 further includes a display interface 402 which performs operations for rendering images to an associated display 430 and an audio interface 432 for performing operations for playing audio content via associated speaker(s) 434.

As used herein, the term "computer program product" may refer, in part, to removable storage unit 418, removable storage unit 422, a hard disk installed in hard disk drive 412, or a carrier wave carrying software over communication path 426 (wireless link or cable) to communication interface 424. Computer readable storage media refers to any non-transitory tangible storage medium that provides recorded instructions and/or data to the computing device 400 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computing device 400. Examples of transitory or non-tangible computer readable transmission media that may also participate in the provision of software, application programs, instructions and/or data to the computing device 400 include radio or infra-red transmission channels as well as a network connection to another computer or networked device, and the Internet or Intranets including e-mail transmissions and information recorded on Websites and the like.

The computer programs (also called computer program code) are stored in main memory 408 and/or secondary memory 410. Computer programs can also be received via the communication interface 424. Such computer programs, when executed, enable the computing device 400 to perform one or more features of embodiments discussed herein. In various embodiments, the computer programs, when executed, enable the processor 404 to perform features of the above-described embodiments. Accordingly, such computer programs represent controllers of the computer system 400.

Software may be stored in a computer program product and loaded into the computing device 400 using the removable storage drive 414, the hard disk drive 412, or the interface 420. Alternatively, the computer program product may be downloaded to the computer system 400 over the communications path 426. The software, when executed by the processor 404, causes the computing device 400 to perform functions of embodiments described herein.

It is to be understood that the embodiment of FIG. 4 is presented merely by way of example. Therefore, in some embodiments one or more features of the computing device 400 may be omitted. Also, in some embodiments, one or more features of the computing device 400 may be combined together. Additionally, in some embodiments, one or more features of the computing device 400 may be split into one or more component parts.

It will be appreciated that the elements illustrated in FIG. 4 function to provide means for performing the various functions and operations of the servers as described in the above embodiments.

In an implementation, a server may be generally described as a physical device including at least one processor and at least one memory including computer program code. The at least one memory and the computer program code are configured to, with the at least one processor, cause the physical device to perform the requisite operations.

It will be appreciated by a person skilled in the art that numerous variations and/or modifications may be made to the present disclosure as shown in the specific embodiments without departing from the spirit or scope of the disclosure as broadly described. The present embodiments are, therefore, to be considered in all respects to be illustrative and not restrictive.

What is claimed is:

1. A system for stand-in processing, comprising:
a processor in communication with a plurality of acquirer computing devices and an issuer computing device via a payment card network, the issuer computing device associated with an issuer of a payment card; and
a memory unit communicatively coupled to the processor, wherein the memory unit is configured to store transaction data received from the acquirer computing devices via the payment card network, the transaction data corresponding to a plurality of transactions made by the payment card, the transaction data for each of the transactions including a data element corresponding to a point of sale (POS) entry mode; and
wherein the processor is configured to:
determine that a value of the data element indicates the POS entry mode for at least one of the transactions as ATM-based;
in response to the indication that the POS entry mode for the at least one transaction is ATM-based, apply at least one stand-in rule provided by the issuer of the payment card to process the at least one transaction on behalf of the issuer, wherein processing comprises one of approving and declining the at least one transaction in a response to the corresponding acquirer computing device, the one of approving and declining determined without communicating the transaction data over the payment card network to the issuer computing device; and
in response to the POS entry mode for a second portion of the transactions being other than ATM-based, for each transaction of the second portion of transactions:
communicate, via the payment card network, the transaction data to the issuer computing device;
receive, via the payment card network from the issuer computing device, an authorization response message that one of approves or declines the corresponding transaction; and
forward the authorization response message to the corresponding acquirer computing device via the payment card network.

2. The system according to claim 1, wherein the processor is configured to select the transaction for processing based on the POS entry mode prior to processing the transaction.

3. The system according to claim 1, wherein the processor is configured to process the transaction on behalf of the issuer through a zone control master key (ZCMK) shared by the issuer.

4. The system according to claim 3, wherein the zone control master key comprises a PIN verification key (PVK).

5. The system according to claim 3, wherein the zone control master key comprises a card verification key (CVK).

6. The system according to claim 1, wherein the data element comprises data element 22 of a message compliant with ISO 8583.

7. A method for stand-in processing, the method comprising the following steps executed by a processor, the processor in communication with a plurality of acquirer computing devices and an issuer computing device via a payment card network, the issuer computing device associated with an issuer of a payment card:
- receiving, from the plurality of acquirer computing devices via the payment card network, transaction data corresponding to a plurality of transactions made by the payment card, the transaction data for each of the transactions including a data element corresponding to a point of sale (POS) entry mode;
- determining that a value of the data element indicates the POS entry mode for at least one of the transactions as ATM-based;
- in response to the indication that the POS entry mode for the at least one transaction is ATM-based, applying at least one stand-in rule provided by the issuer of the payment card to process the transaction on behalf of the issuer, wherein processing comprises one of approving and declining the at least one transaction in a response to the corresponding acquirer computing device, the one of approving and declining determined without communicating the transaction data over the payment card network to the issuer computing device; and
- in response to the POS entry mode for a second portion of the transactions being other than ATM-based, for each transaction of the second portion of transactions:
- communicating, via the payment card network, the transaction data to the issuer computing device;
- receiving, via the payment card network from the issuer computing device, an authorization response message that one of approves or declines the corresponding transaction; and
- forwarding the authorization response message to the corresponding acquirer computing device via the payment card network.

8. The method according to claim 7, further comprising selecting the transaction for processing based on the POS entry mode prior to the processing step.

9. The method, according to claim 7 wherein processing the transaction on behalf of the issuer comprises using a zone control master key (ZCMK) shared by the issuer.

10. The method according to claim 9, wherein the zone control master key comprises a PIN verification key (PVK).

11. The method according to claim 9, wherein the zone control master key comprises a card verification key (CVK).

12. The method according to claim 7, wherein the data element comprises data element 22 of a message compliant with ISO 8583.

* * * * *